(12) United States Patent
Hébert et al.

(10) Patent No.: US 7,174,844 B2
(45) Date of Patent: Feb. 13, 2007

(54) SIMULATOR AND METHOD FOR PERFORMING UNDERWATER SUBMARINE ESCAPE TRAINING

(75) Inventors: Louis Hébert, Pointe-au-Pére (CA); Jean-Francois Goulet, Luceville (CA); Aurem Langevin, Pointe-au-Pére (CA); Luc Garand, Luceville (CA)

(73) Assignee: Innovation Maritim, Rimouski (CA)

( * ) Notice: Subject to any disclaimer, the term of this patent is extended or adjusted under 35 U.S.C. 154(b) by 565 days.

(21) Appl. No.: 10/616,229

(22) Filed: Jul. 9, 2003

(65) Prior Publication Data
US 2005/0008991 A1 Jan. 13, 2005

(51) Int. Cl.
*B63G 8/40* (2006.01)

(52) U.S. Cl. .................. 114/312; 114/313; 114/314; 114/331; 114/336; 405/185

(58) Field of Classification Search ............ 114/312, 114/313, 314, 330, 331, 336; 405/185, 192
See application file for complete search history.

(56) References Cited

U.S. PATENT DOCUMENTS

| | | | | |
|---|---|---|---|---|
| 1,929,168 A | * | 10/1933 | Grieshaber | 114/323 |
| 1,980,647 A | * | 11/1934 | Viveiros | 114/323 |
| 2,374,296 A | | 4/1945 | Ming | |
| 3,323,312 A | * | 6/1967 | Banjavich | 405/193 |
| 3,351,035 A | | 11/1967 | McLean | |
| 3,486,242 A | | 12/1969 | Aronson | |
| 3,542,934 A | | 11/1970 | Warhurst et al. | |
| 3,561,137 A | | 2/1971 | Guyon et al. | |
| 3,606,854 A | * | 9/1971 | Van Lunteren | 114/294 |
| 3,757,722 A | | 9/1973 | Seiple | |
| 3,936,895 A | * | 2/1976 | Talkington | 441/21 |
| 4,026,283 A | * | 5/1977 | Banjavich et al. | 128/201.27 |
| 4,111,313 A | | 9/1978 | Reiher et al. | |
| 4,117,688 A | * | 10/1978 | Ball | 405/188 |
| 4,184,801 A | | 1/1980 | Nicoloff et al. | |
| 4,217,066 A | | 8/1980 | Gunther | |
| 4,362,154 A | * | 12/1982 | Le Masson | 128/204.22 |
| 4,427,385 A | | 1/1984 | Galerne | |
| 4,823,722 A | | 4/1989 | Gass | |
| 5,222,894 A | | 6/1993 | Cabana | |

(Continued)

FOREIGN PATENT DOCUMENTS

AU 566600 5/1984

(Continued)

*Primary Examiner*—Sherman Basinger
(74) *Attorney, Agent, or Firm*—A. Jose Cortina; Daniels Daniels & Verdonik, P.A.

(57) ABSTRACT

The simulator of the present invention comprises a submersible structure to be used in a body of water, for instance a pool. This structure comprises a bell defining a main chamber. An escape tower is provided over the bell. This escape tower defines an escape chamber communicating with the main chamber. The escape tower has a lower hatch between the main chamber and the escape chamber, and an upper hatch separating the escape chamber from outside the submersible structure. The simulator also comprises a mechanism for vertically moving the submersible structure relative to the water surface. A method of performing underwater submarine escape training is also disclosed. The simulator allows such training to be conducted in a safe and controlled environment.

37 Claims, 11 Drawing Sheets

U.S. PATENT DOCUMENTS

| | | |
|---|---|---|
| 5,316,480 A | 5/1994 | Ellsworth |
| 5,373,925 A | 12/1994 | Handford et al. |
| 5,458,490 A | 10/1995 | Cabana |
| 5,888,069 A | 3/1999 | Romanoff et al. |

FOREIGN PATENT DOCUMENTS

| | | |
|---|---|---|
| AU | 43037/85 | 12/1985 |
| EP | 0339858 A2 | 11/1989 |
| FR | 682.417 | 9/1926 |
| FR | 682.417 | 2/1930 |
| FR | 2617115 | 6/1987 |
| GB | 912377 | 12/1962 |
| GB | 2181707 A | 4/1987 |
| WO | PCT/CA03/01039 | 9/2003 |

\* cited by examiner

# SIMULATOR AND METHOD FOR PERFORMING UNDERWATER SUBMARINE ESCAPE TRAINING

TECHNICAL FIELD

The present invention relates to a simulator and a method for performing underwater submarine escape training.

BACKGROUND

Military submarines are highly complex machines which proved to be relatively safe for the submariners aboard them. However, serious accidents did happen in the past and there is always the risk that some may happen in the future. Any submariners must then be ready for all kinds of emergencies and training is an essential part of this preparation. Extensive training is often a factor that allowed people to come out of difficult situations without any or serious harm.

Among all potential dangers of being in a submarine, one of them is to be stuck underwater with no other option but to leave the submarine before outside help can arrive. Some naval forces do have small submarines which can be attached over a hatch and provide an escape vehicle to leave a submerged submarine in distress. Unfortunately, it is not always possible to use such vehicle since it is almost never immediately available. Submariners must then be able to leave a submerged submarine by themselves if that is required. This is the reason why military submarines are conventionally provided with one or more exits called "escape towers". One escape tower is usually provided near the front of the submarine and one at the rear.

Escape suits conventionally found in submarines allow the submariners to escape without pressurized air from a compressed air cylinder. One of the reasons is that there are many persons in a military submarine so that the number of air cylinders would be too important. Another reason is that air inside a submarine is not pressurized and is maintained at the sea level. There are thus no decompression stages to follow in that case.

An escape suit is designed to be watertight and air inflatable. An example of suit is the "Mark X" escape suit. The suit is used with glove and a nose clip. The escape suit keeps the submariner dry and warm while he is in water or aboard a life raft. Air inside the suit increases the thermal insulation. Once inflated, the suit also allows the submariner to quickly reach the surface. The suit is equipped with a hood inflation system (HIS) which further allows the submariner to keep his face out of the water. The HIS consists of a hood, partly made of transparent plastic, which completely covers the head and face of the person. Small air vents in the suit, at the upper chest, allow air to flow from the suit into the hood compartment. A small space is maintained between a part of the hood on the chest and the outside. The HIS retains air therein, thereby allowing the head to remain clear of the water and the submariner to breathe if necessary. However, during an ascent, the submariner must expel air. Pressurized air is forced into the escape suit immediately before leaving the submarine through the escape tower. This is possible by using a push fit connector insertable in a pressurized air outlet called a "stole charging valve".

Escape suits are usually equipped with a compact individual raft to be inflated once at the surface using a $CO_2$ canister. This allows the submariner to get out of the water and wait for rescue. The rafts of two or more persons may be attached together so as to facilitate the search and rescue operations. Usually, the first vehicle to reach the scene in a search and rescue operation is an airplane. The airplane typically drops one or more large life rafts provided with supplies. Submariners climb on board these larger rafts and wait for surface rescue or rescue helicopters to arrive.

Training for escaping out of a submerged submarine through the escape tower was usually done without ever having the submariners experiencing the complete escape procedures itself. Submarines are not adequate locations for this kind of training because the escape procedure involves a certain level of danger. Some hands-on training was possible only using fixed towers filled with water and at the bottom of which a submariner can exit through a hatch and experience an assent using the submarine escape suit. One of such training facility is located in Gosport, United Kingdom.

Considering this background, it clearly appears that there was a need to provide a simulator and a method of performing underwater submarine escape training in a body of water, thereby allowing submariners to have hands-on training on submarine escape procedures in a controlled and safe environment.

SUMMARY

In brief, the simulator of the present invention comprises a submersible structure to be used in a body of water, for instance a pool. This structure comprises a bell defining a main chamber. An escape tower is provided over the bell. This escape tower defines an escape chamber communicating with the main chamber. The escape tower has a lower hatch between the main chamber and the escape chamber, and an upper hatch separating the escape chamber from outside the submersible structure. The simulator also comprises means for vertically moving the submersible structure relative to the water surface.

This and other aspects of the present invention are described in or apparent from the following detailed description of a preferred embodiment, made in conjunction with the accompanying figures.

DETAILED DESCRIPTION

The appended figures show a simulator (10) in accordance with the preferred embodiment of the present invention. It should be understood that the present invention is not limited to the illustrated implementation and that various changes and modifications may be effected therein without departing from the scope of the appended claims. For instance, the present invention is not limited to military submarines and can be used with any kind of submarines, submerged constructions or the like. It should also be noted that throughout the figures, the parts which are not referred to may correspond to the same parts which are shown in other figures.

Figure 1:
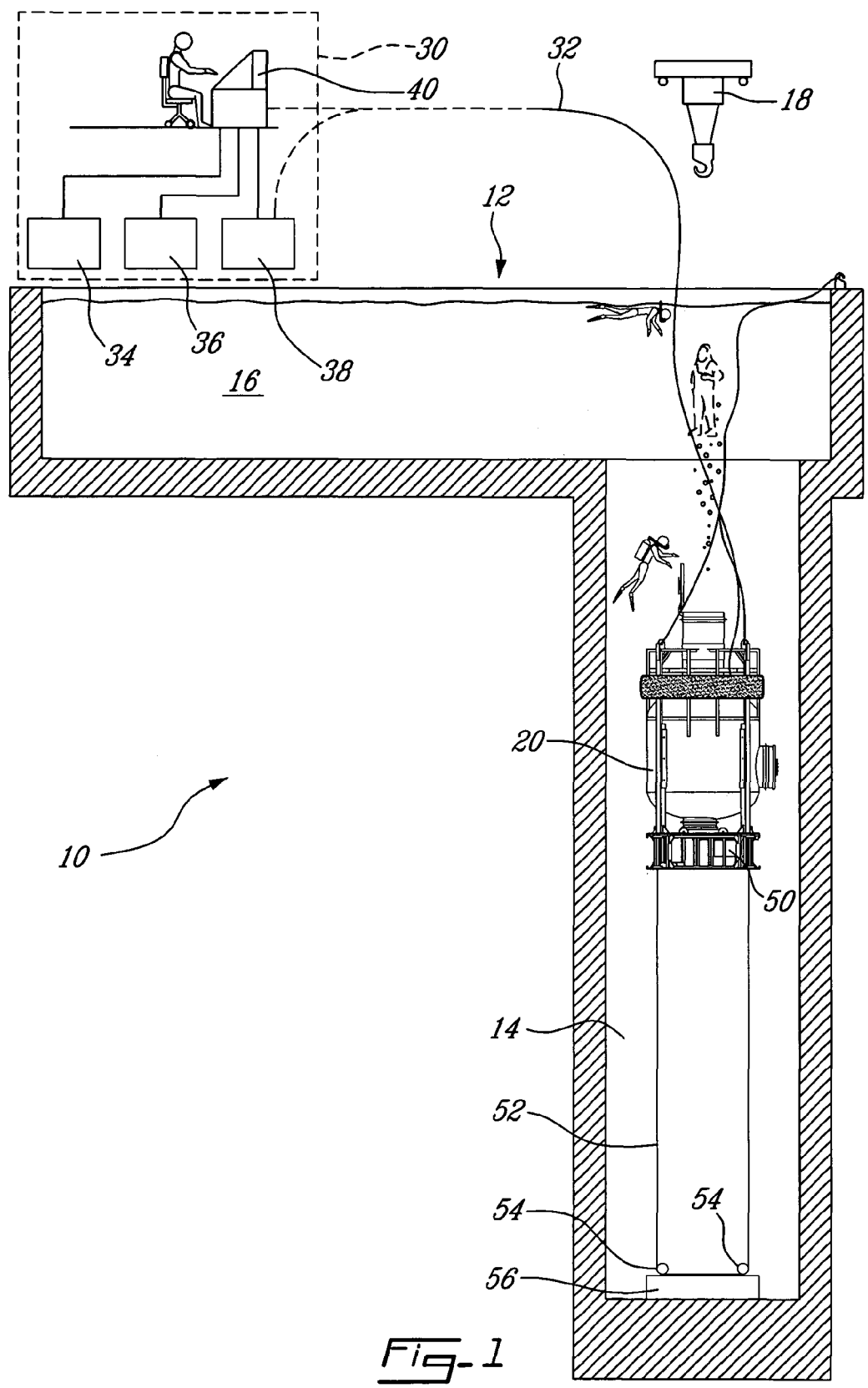
FIG. 1 shows a simulator in accordance with the preferred embodiment of the present invention.
Figure 2:
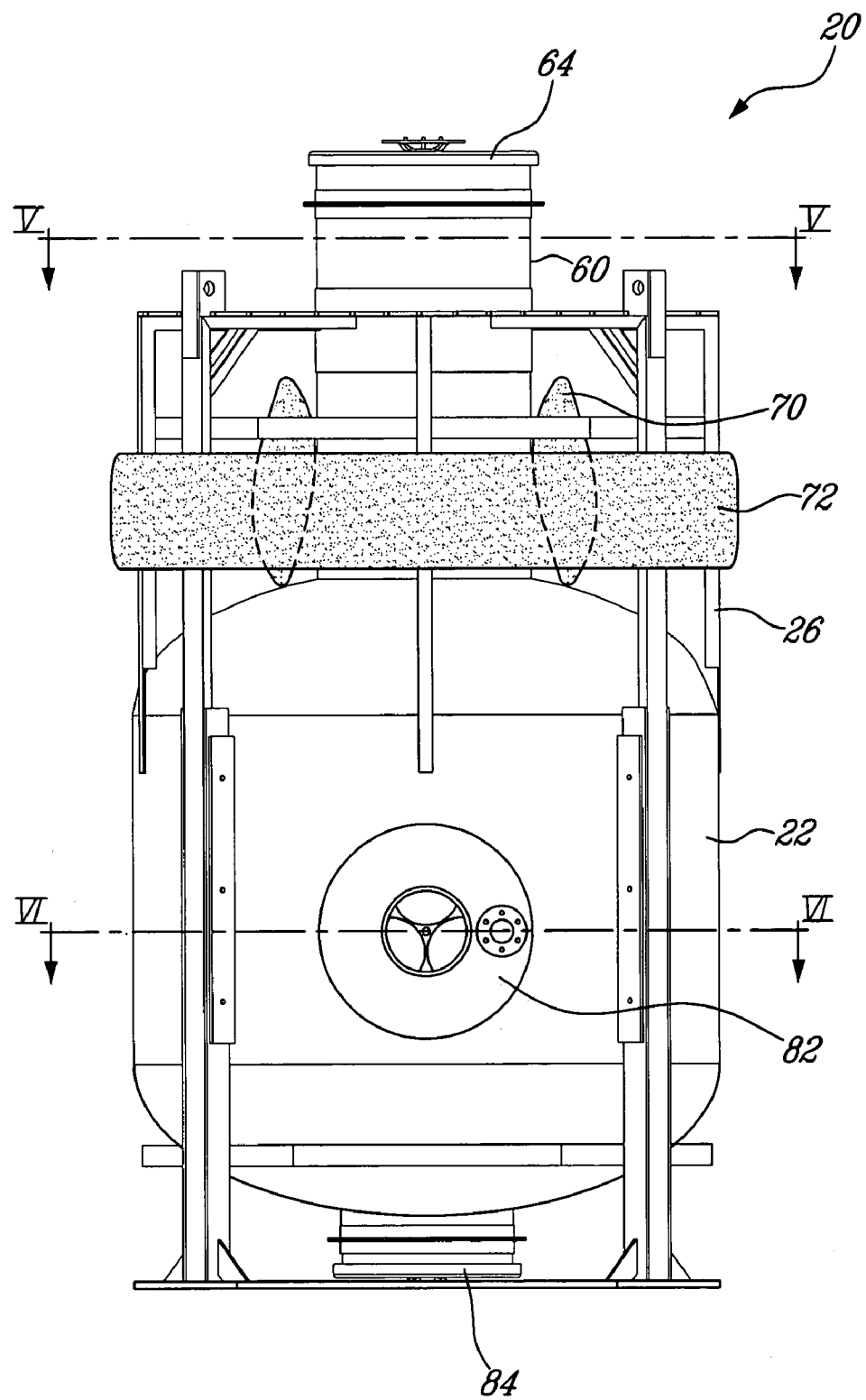
FIG. 2 is a side view showing the upper part of the submersible structure of FIG. 1.
Figure 3:
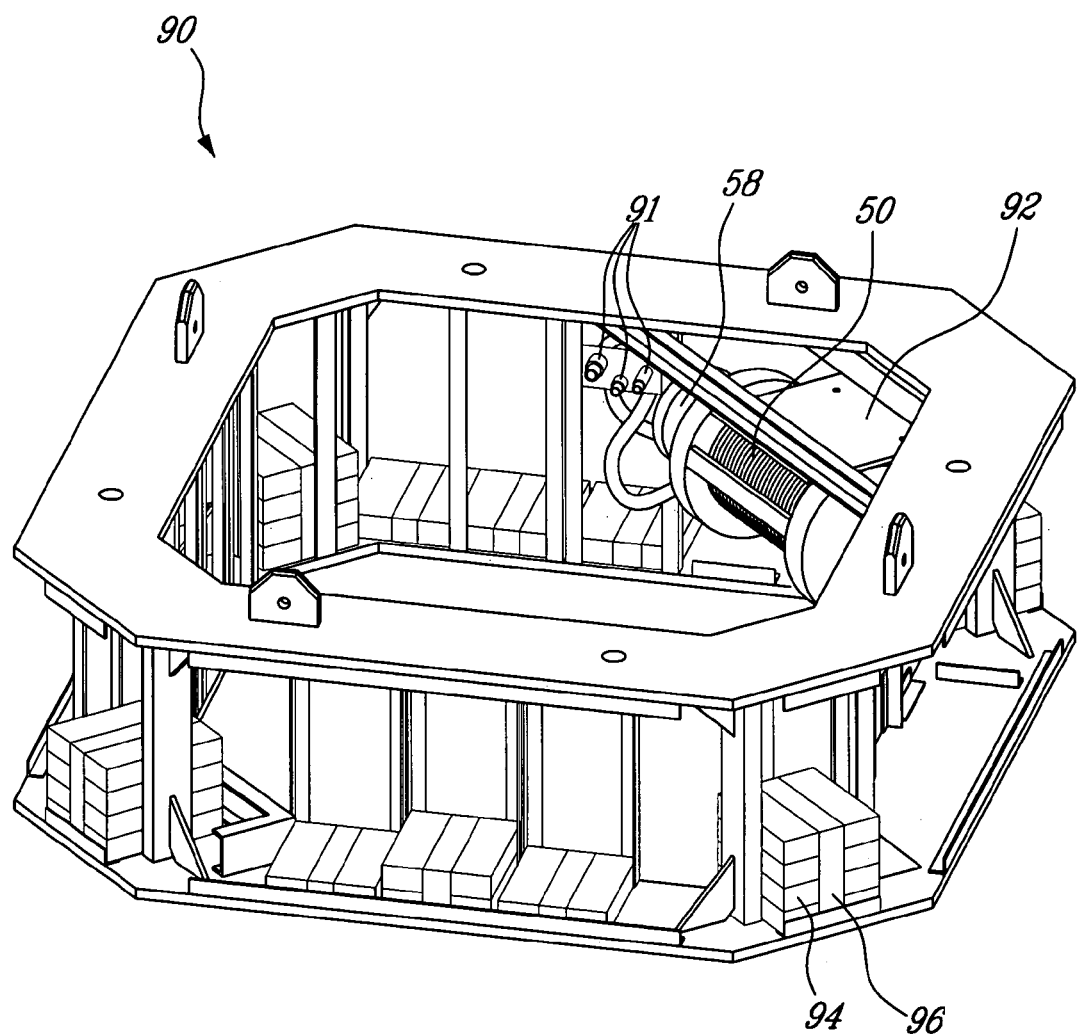
FIG. 3 is a perspective view of the base of the submersible structure simulator of FIG. 1.

As shown in FIG. 1, the simulator (10) comprises a submersible structure (20). The submersible structure (20) is used to simulate a submarine unable to surface and in which an immediate danger requires that it be evacuated before outside help can arrive. The submersible structure (20) is designed to be used in a body of water. An example of a body of water is a pool, more particularly an indoor pool (12). This allows having full control of the operating environment. It may otherwise be another kind of body of water, including, a lake, an ocean, etc. If a pool is used, as in FIG. 1, the pool (12) may comprise a cylindrical shaft (14) downwardly extending from the bottom portion of a shallower section (16) of the pool (12). This has the advantage of reducing the quantity of water inside the pool (12) while still providing the deeper portion required to perform the underwater training. The pool (12) may otherwise only consist of the cylindrical shaft (14), thereby being provided without the shallower section (16).

A traveling crane (18) may be advantageously provided above the pool (12) to pull the submersible structure (20) out of the water for maintenance and storage. Cables, chains or straps are used between the hook of the traveling crane (18) and the submersible structure (20). Also, a bridge (not shown) may be provided over the water surface to facilitate the access into the submersible structure (20).

The submersible structure (20) is preferably connected to a remote supply unit (30). The connection between them is made by an element called the "umbilical cable" (32). Nevertheless, it should be noted that it is possible to provide a fully autonomous submersible structure (20) which requires no supply from the outside.

The umbilical cable (32) preferably includes a flexible but pressure-resistant outer tube enclosing a number of smaller tubes and cables. It allows connection of the remote supply unit (30) to the submersible structure (20) at all time. If desired, more than one umbilical cable (32) can be used. Similarly, more than one remote supply unit (30) can be used as well.

Air needs to be supplied to the submersible structure (20) of the preferred embodiment. For greater safety, the air supply comes from at least two different sources, namely from a low pressure system (34) and from a high pressure system (36). The high pressure system (36) may include an air bank, which allows maintaining a continuous air supply in case of a power failure. The umbilical cable (32) preferably provides two breathing air links. The outer tube of the umbilical cable (32) may further be used to send stale air outside the submersible structure (20). This prevents bubbles from being generated in the pool (12), which bubbles can diminish the visibility. The umbilical cable (32) of the preferred embodiment further comprises a telecommunications link and an electrical power link. The electrical system in the submersible structure (20) advantageously uses a low voltage for safely reasons, for instance 12 or 24 Volts DC.

The preferred embodiment uses hydraulic power from a remote hydraulic system (38) to supply a hydraulic motor mounted on the submersible structure (20). This remote hydraulic system (38) is thus connected to the umbilical cable (32).

Figure 10:
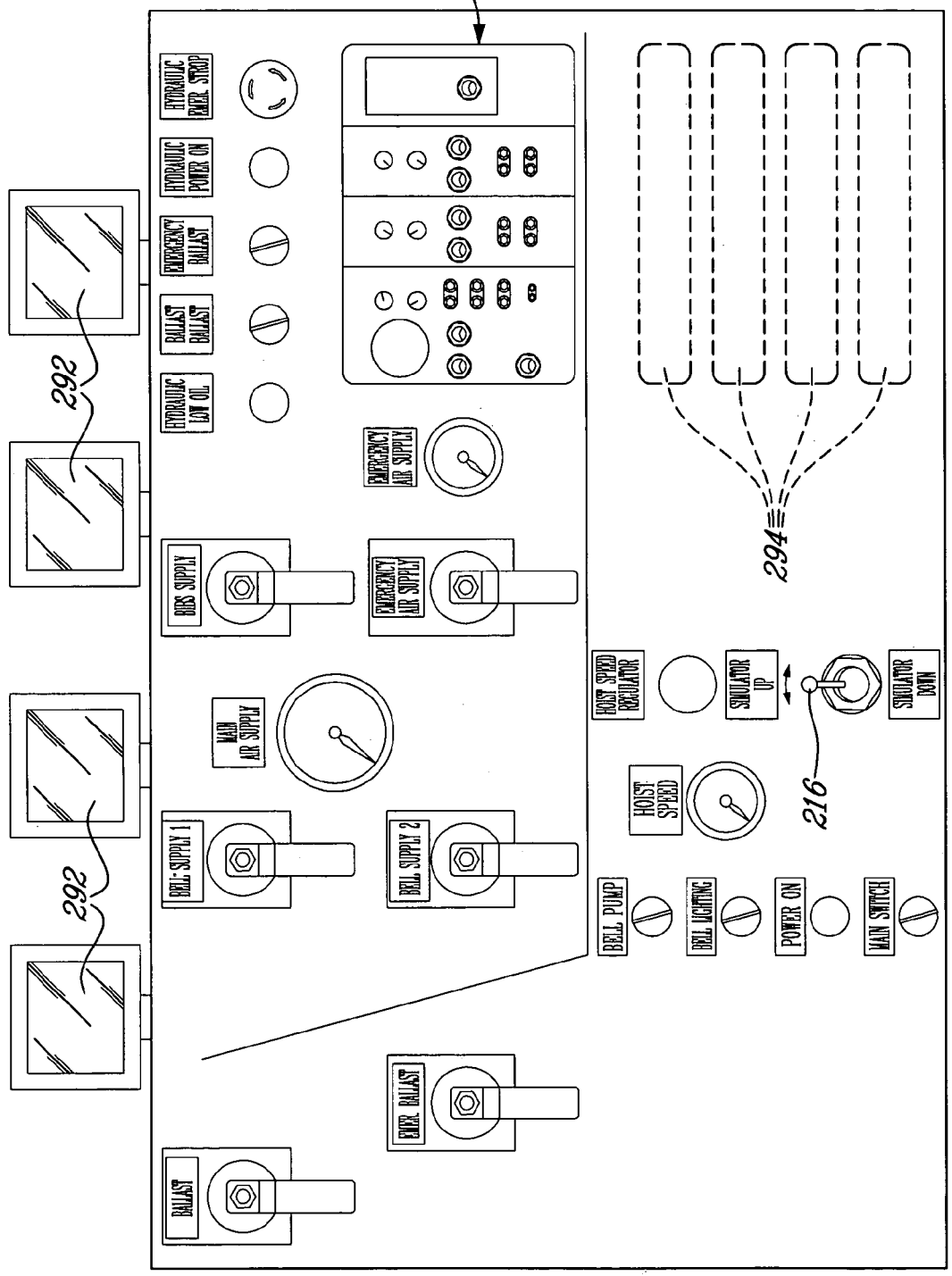
FIG. 10 shows an example of a control panel.

The remote supply unit (30) is preferably controlled from a control panel (40) located outside the pool (12). It allows a supervisor to have a full control of the operations and ensure the safety of the training. For instance, the depth of the submersible structure (20) is controlled from the control panel (40). If there is any problem, the supervisor can bring the submersible structure (20) to the surface. FIG. 10 illustrates an example of a control panel (40).

Advantageously, all connections with the umbilical cable (32) are removable and with a unique pattern. A well designed simulator (10) should have no way to mistakenly connect the connectors to the wrong connection point. Connectors of different sizes should then be used. Inverted male and female ends are also another technique.

The simulator (10) comprises means for vertically moving the submersible structure (20) relative to the water surface. In the preferred embodiment, these means are provided as means for pulling the submersible structure (20) downwards. Pulling the submersible structure (20) downwards allows to bring it to the desired depth and adjust the depth whenever it is necessary. This is preferably achieved by means of a winch (50) operated in conjunction with a cable (52) connected to a bottom location in the pool (12). The winch (50) is provided under the submersible structure (20). The winch (50) comprises a reel around which a cable (52) is wound. The bottom location can be a fixed point at the bottom of the pool (12) or, preferably, one or more pulleys (54) anchored thereto. Two pulleys (54) are used in the illustrated embodiment. The end of the cable (52) is attached under the submersible structure (20). The pulley or pulleys (54) at the bottom of the pool (12) can be either directly anchored to the wall of the pool (12) or, as illustrated in FIG. 1, anchored to a dead weight (56) resting by gravity at the end of the pool (12). The use of the dead weight (56) is preferred since it prevents the pool (12) from being damaged by wall anchors. It also simplifies the maintenance. Of course, the dead weight (56) must be heavy enough to compensate for the buoyancy of the submersible structure (20).

Figure 9:
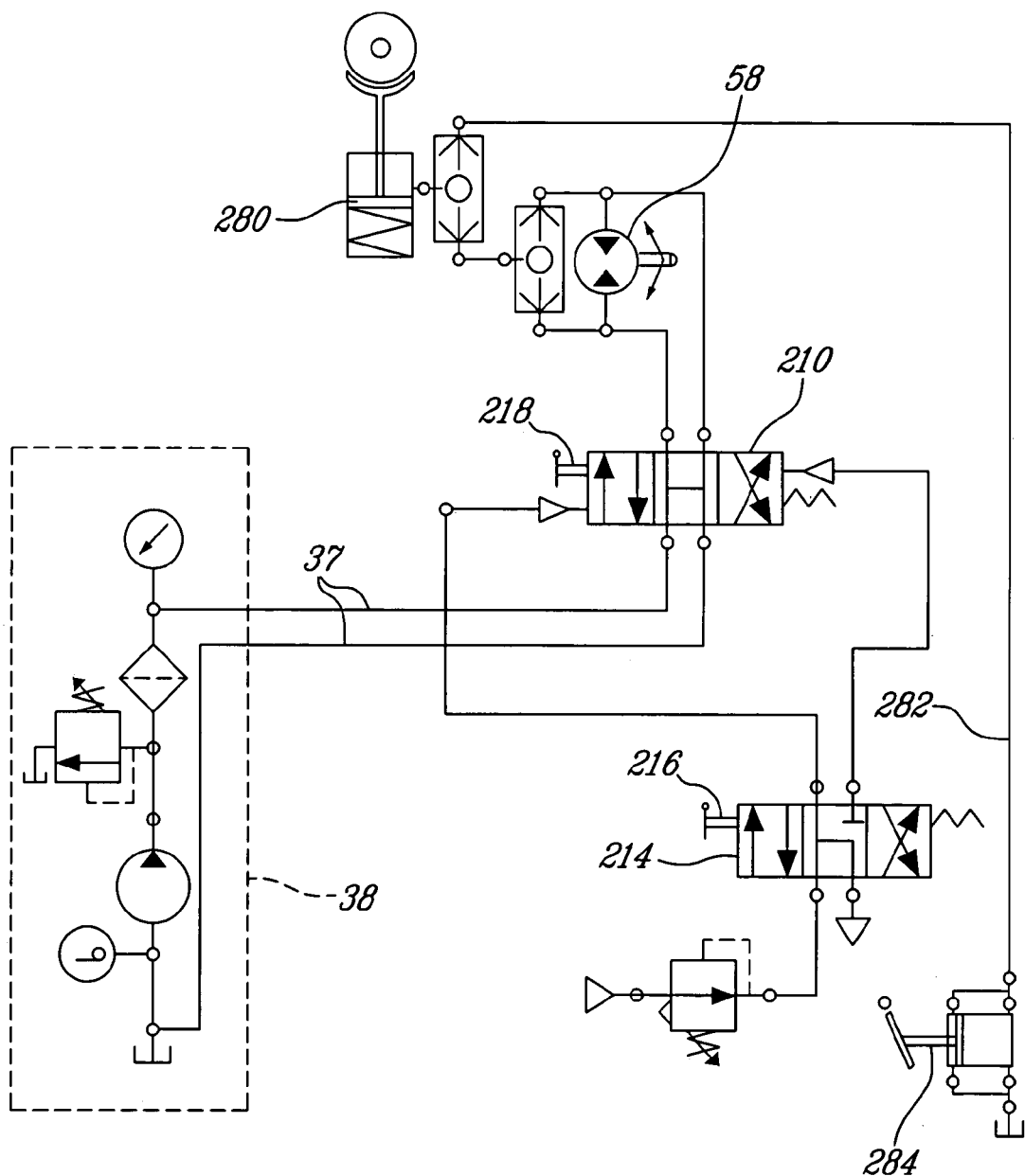
FIG. 9 is a diagram showing the hydraulic system in accordance with the preferred embodiment.

In the preferred embodiment, the winch (50) comprises a hydraulic motor (58), which is schematically shown in FIG. 9. The hydraulic motor (58) is preferably powered through hydraulic pressure lines coming from through the umbilical cable (32). It can also be powered through a hydraulic system (not shown) located inside the submersible structure (20).

It should be noted that other means for vertically moving the submersible structure (20) relative to the water surface may be provided. For instance, it is possible to use a submersible structure (20) having negative buoyancy and which is retained by upper pulling cables (not shown). A combination of upper and bottom pulling cables is also possible. It may be further possible to use a vertical railing system (not shown) similar to the ones guiding conventional elevators. Such railing system may even be set at an angle instead of being vertical, the depth of the submersible structure (20) being adjusted by moving it up or down the slope. In case of an emergency, water in the pool (12) may be drained very quickly to rescue the persons in the submersible structure (20).

The telecommunications link allows two way audio-communications between the instructor inside the submersible structure (20), and the operator standing at the control panel (40). Wireless communication is also possible. The instructor and the supervisor should always have a headset with a microphone in order to communicate efficiently with one another. A back up communication system should also be provided in case of a power failure. One can also provide a battery (not shown) in the submersible structure (20) and the control panel (40) so that power remains available at all time. At worse, if there is a stale air connection using the flexible outer tube of the umbilical cable (32), it is possible to have a voice exchange from the stale air outlet and the distal end of the outer flexible tube.

Preferably, one or more divers assist the trainees throughout the training procedure. During training exercises, divers are preferably used to make sure that no trainee remains stuck when leaving the submersible structure (20). The divers are also the ones which assemble the parts and disassemble them between training sessions. Because the pool (12) uses chemicals to treat the water, for instance chlorine, it is usually required that the submersible structure (20) be removed from the water between training sessions. Before the training session, the diver or divers will install the cable (52) of the winch (50) through the pulleys (54) located at the bottom of the pool (12), if required. Moreover, divers should have tools in the pool (12) in order to cut the cable (52) retaining the submersible structure (20), should the pulling system become stuck or is otherwise not functioning in spite of all the safety features.

FIGS. 2 to 6 are various views of the submersible structure (20) in accordance with the preferred embodiment. As shown in these figures, the submersible structure (20) comprises a bell (22). The bell (22) defines a main chamber (24). The bell (22) is designed to be large enough so that the main chamber (24) can accommodate an instructor and one or more trainees.

The submersible structure (20) is preferably protected by an outer framework (26). This framework (26) allows various parts to be connected to the submersible structure (20). It also provides connection points for its handling, for instance using the traveling crane (18).

An escape tower (60) is provided over the bell (22). The escape tower (60) defines an escape chamber (62). The escape tower (60) used on the simulator (10) is preferably identical or very similar to the one found on the submarine on which the trainees will be submariners. The escape tower (60) is preferably centered with reference to the bell (22). Other designs are also possible. It should be noted that the illustrated escape tower (60) is for a Victoria class submarine of the Canadian Navy.

The escape tower (60) further comprises an upper hatch (64) separating the escape chamber (62) from outside the submersible structure (20). A typical diameter for the upper hatch (64) is 30 inches. The upper hatch (64) is hingedly connected at the top of the escape tower (60). It comprises a locking system operated from inside and outside. The upper hatch (64) also advantageously comprises a port. This allows a diver in the pool (12) to see what is going on in the escape chamber (62).

The submersible structure (20) may further comprise at least one pneumatically inflatable float (70) connected to the outer framework (26) The inflatable float or floats (70) are provided to adjust the buoyancy of the submersible structure (20). Ideally, the upward force created by the positive buoyancy must be high enough to prevent the submersible structure (20) from easily moving sideward. It must otherwise remain reasonable so as to minimize the stresses on the winch (50) and the pulleys (54). Furthermore, one or more large emergency inflatable floats (72) may be provided to bring the submersible structure (20) to the surface in case the main chamber (24) becomes flooded. The submersible structure (20) is designed so that the upper hatch (64) of the escape tower (60) will always be above the water surface when the submersible structure (20) is floating at the water surface. This allows the persons in the submersible structure (20) to escape.

Figure 5:
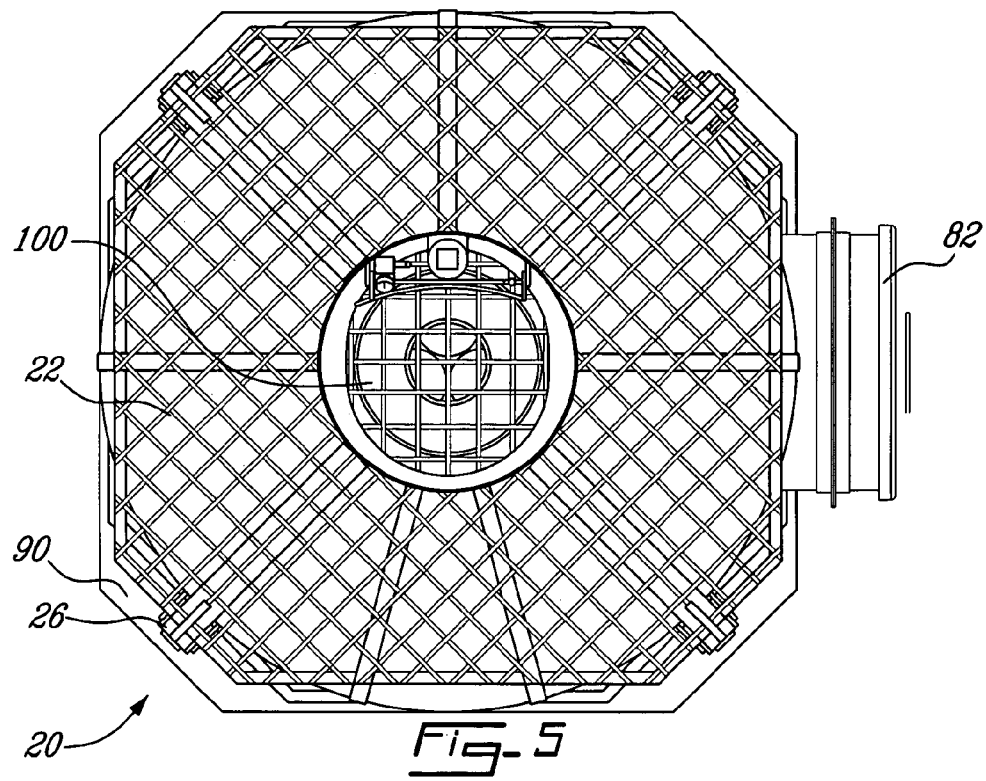
FIG. 5 is a cross-sectional view of the submersible structure taken along line V—V in FIG. 2.

If desired, as in a real submarine, a remote closing mechanism (80) can be provided for moving the upper hatch (64) between an open position and a closed position from the main chamber (24). Such remote closing mechanism (80) is quite important in a real submarine since once a submariner escapes through the escape tower (60), it cannot close the upper hatch (64) behind him. This mechanism (80) is schematically illustrated in FIG. 5. It is not required in the simulator (10). Instead, the diver or divers may close the upper hatch (64) manually and only a fake handle (81) is provided in the main chamber (24) for training purposes.

The bell (22) preferably comprises a side maintenance hatch (82) located on the side thereof. This side hatch (82) is pivotally connected outside the bell (22). It is used to access the main chamber (24) when the submersible structure (20) is completely out of the water. It advantageously comprises a port to see into the main chamber (24) from outside. A typical diameter for the side hatch (82) is 30 inches. It may otherwise be used to evacuate a wounded person from the main chamber (24). However, this would require that the submersible structure (20) be moved out of the water using the traveling crane (18).

A bottom emergency hatch (84) is preferably provided under the bell (22). This bottom hatch (84) separates the main chamber (24) from outside the submersible structure (20). It opens towards the outside, thereby being maintained in a closed position by the water pressure during training, in addition to the usual locking mechanism. It can be used as an emergency exit in the unlikely event of a dramatic failure of the simulator (10). If no other means of escaping out of the submersible structure (20) is possible, the main chamber (24) can be pressurized and the bell (22) can then be used as a diving bell. The bottom hatch (84) opens, when unlocked, as soon as the pressure in the main chamber (24) is higher than that of the surrounding water. Opening the bottom hatch (84) will allow persons therein to dive out.

The submersible structure (20) of the preferred embodiment comprises a base (90) that is removably connected under the bell (22). The base (90) is individually shown in FIG. 3. This base (90) is preferably connected under the outer framework (26) by a plurality of removable fasteners, for instance galvanized steel bolts and nuts. Removable fasteners facilitates the storage of the submersible structure (20) outside the pool (12) or its transportation. The base (90) preferably comprises a side plate (92) under which the winch (50) is installed.

Before a training session, the base (90) is preferably brought into the shallower part (16) of the pool (12) using the traveling crane (18). The upper part of the submersible structure (20) is positioned over it and the removable fasteners are put in place by the diver or divers. If required, the removable hydraulic connections are also attached by one of the divers. It may thus be advantageous to provide the base (90) with hydraulic connectors (91) at the inner side of the base (90). This way, it is easier for the diver to apply the required force to insert the hydraulic connectors from the umbilical cable (32) into the connectors (91) of the base (90). It should be noted that the base (90) may otherwise be permanently integrated with the remainder of the submersible structure (20).

The base (90) is adapted to receive ballasts (94), for instance lead bricks or others which are firmly attached thereto by straps (96), in order to balance the submersible structure (20). These ballasts (94) also allow control of the buoyancy of the submersible structure (20). In the preferred embodiment, the buoyancy is designed to be positive, i.e. that the submersible structure (20) will float by itself.

Figure 4:
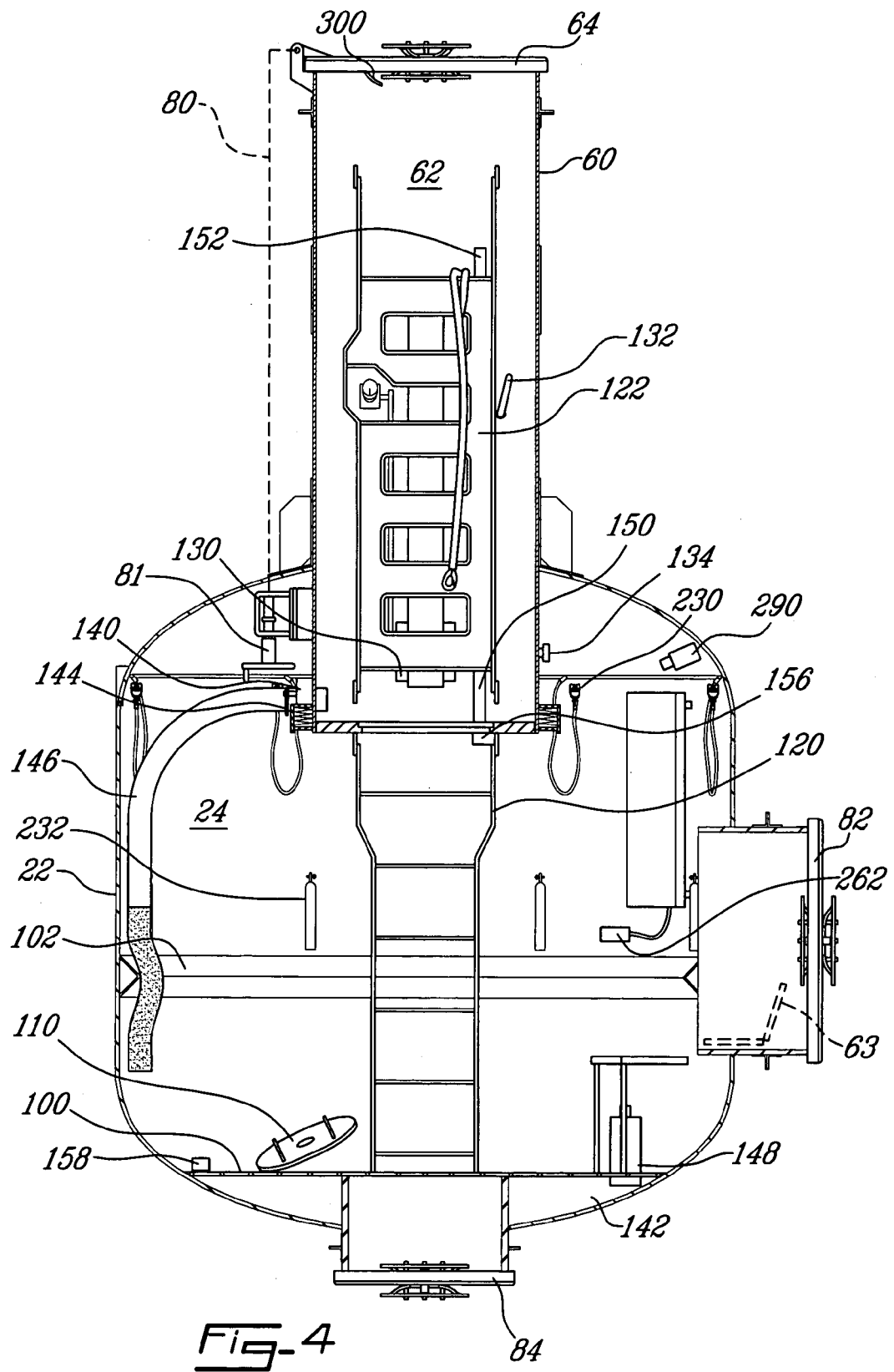
FIG. 4 is a cross-sectional view of the interior of the submersible structure of FIG. 1.
Figure 6:
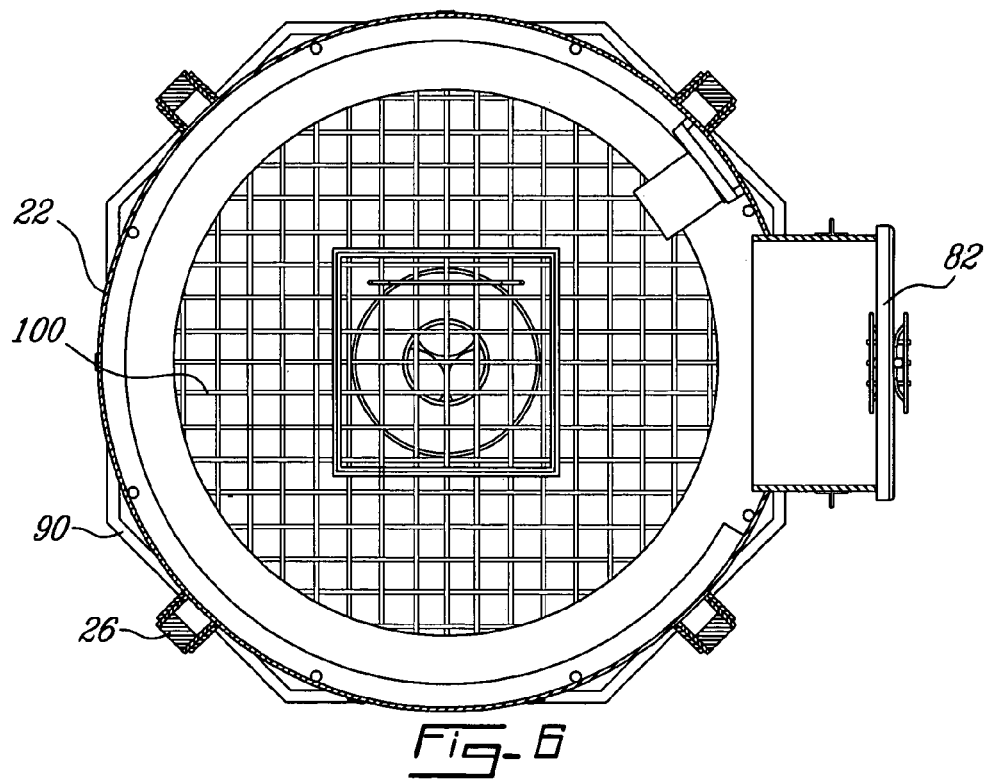
FIG. 6 is a cross-sectional view of the submersible structure taken along line VI—VI in FIG. 2.

FIGS. 4 to 6 show the interior of the submersible structure (20) without the framework (26), the base (30) and other external parts. The instructor and the trainees stand over gratings (100) or any other kind of flooring when they are in the main chamber (24). The gratings (100) prevents the persons therein from standing directly on the bottom hatch (84), if any, and the hull of the bell (22). Access to the bottom hatch (84) is possible upon lifting a removable portion of the gratings (100). A small rim (102) projecting from the interior wall of the bell (22) allows the persons to be partially seated.

The escape tower (60) has a lower hatch (110) between the main chamber (24) and the escape chamber (62). The lower hatch (110) closes from the upper side. Preferably, it is fully removable and maintains in place by gravity and by the weight of the water when the escape chamber (62) is flooded. It has a slightly oval shape, allowing it to be passed through the opening from the main chamber (24) into the escape chamber (62). Two handles allow it to be more easily manipulated. It further has a port, which allows an instructor standing in the main chamber (24) to see what is happening in the escape chamber (62).

A removable ladder (120) is provided in the main chamber (24) to facilitate the access to the escape chamber (62). Other means for climbing into the escape chamber (62) may be used as well. Another ladder (122) is provided in the wall of the escape chamber (62).

The interior of the main chamber (24) is provided with all the required equipment, for instance communication equipment, air supply equipment, training manuals. etc. Watertight lamps are used to provide adequate lighting in the main chamber (24) and in the escape chamber (62). Safety equipment is also provided, including an emergency breathable air supply. Flashlights and chemical lights are also provided for any emergency. If desired, an atmosphere monitoring system (63) can be installed in the main chamber (24) for monitoring parameters such as the air quality and pressure.

The submersible structure (20) comprises means for flooding the escape chamber (62). Preferably, these means comprise a flooding valve (130) being configured and disposed to control a flow of water into the escape chamber (62) coming from the pool (12). An example of flooding valve (130) is a 3-inch ball valve. The flooding valve (130) can be operated using either a flooding valve lever (132) in the escape chamber (62) and a second flooding valve lever (134) in the main chamber (24).

The means for draining the escape chamber (62) are also provided. They preferably comprise a draining valve (140) configured and disposed to control a flow of water between the bottom of the escape chamber (62) and a sump (142) created between the base of the bell (22) and the gratings (100). The draining valve (140) is operated using a draining valve lever (144) in the main chamber (24). Other configurations are also possible. Preferably, when draining the water, it is sent in a flexible tube (146) having an end near the gratings (100). The water then falls into the sump (142). A sump pump (148), having a suction inlet underneath the gratings (100), allows sending the water drained from the escape chamber (62) back into the pool (12). The sump pump (148) is preferably an electrical pump supplied through the electrical link.

Means for venting the escape chamber (62) during flooding and draining are further provided. They preferably comprise a vent air pipe (150) having an upper end (152) located near the upper hatch (64), and a bottom end connected to a venting valve (156). The venting valve (156) is configured and disposed to control the flow of air between the escape chamber (62) and the main chamber (24). An example of venting valve (156) is a 2-inch ball valve. Venting the escape chamber (62) is important since air would otherwise be trapped in the escape chamber (62) as the water level rises. Air pressure would than rise until the point that the upper hatch (64) opens and water rushes to fill the escape chamber (62) entirely. The trainee inside the escape chamber (62) would then receive a large quantity of water at once.

The air valve (156) is usually controlled only from inside the main chamber (24). Therefore, the training usually takes place using the "last man" situation. Every trainee trains for the situation where they are the last person to leave a submarine in distress. They must thus have everything perfect the first time, because if they are the last man to leave the submarine, no one will be there to correct a critical mistake. One of the difficulties is to control the air vent from inside the escape chamber (62). The problem is that by the time the water level reaches the upper end (152) of the vent pipe (150), the trainee, having its suit fully inflated, is not in the best position to manipulate any valve. Instead, he closes the upper end (152) of the vent pipe (150) using a handheld cap (158), for instance made of heavy metal, which will allow the water level to rise up to the point where the upper hatch (64) can be opened.

Figure 7:
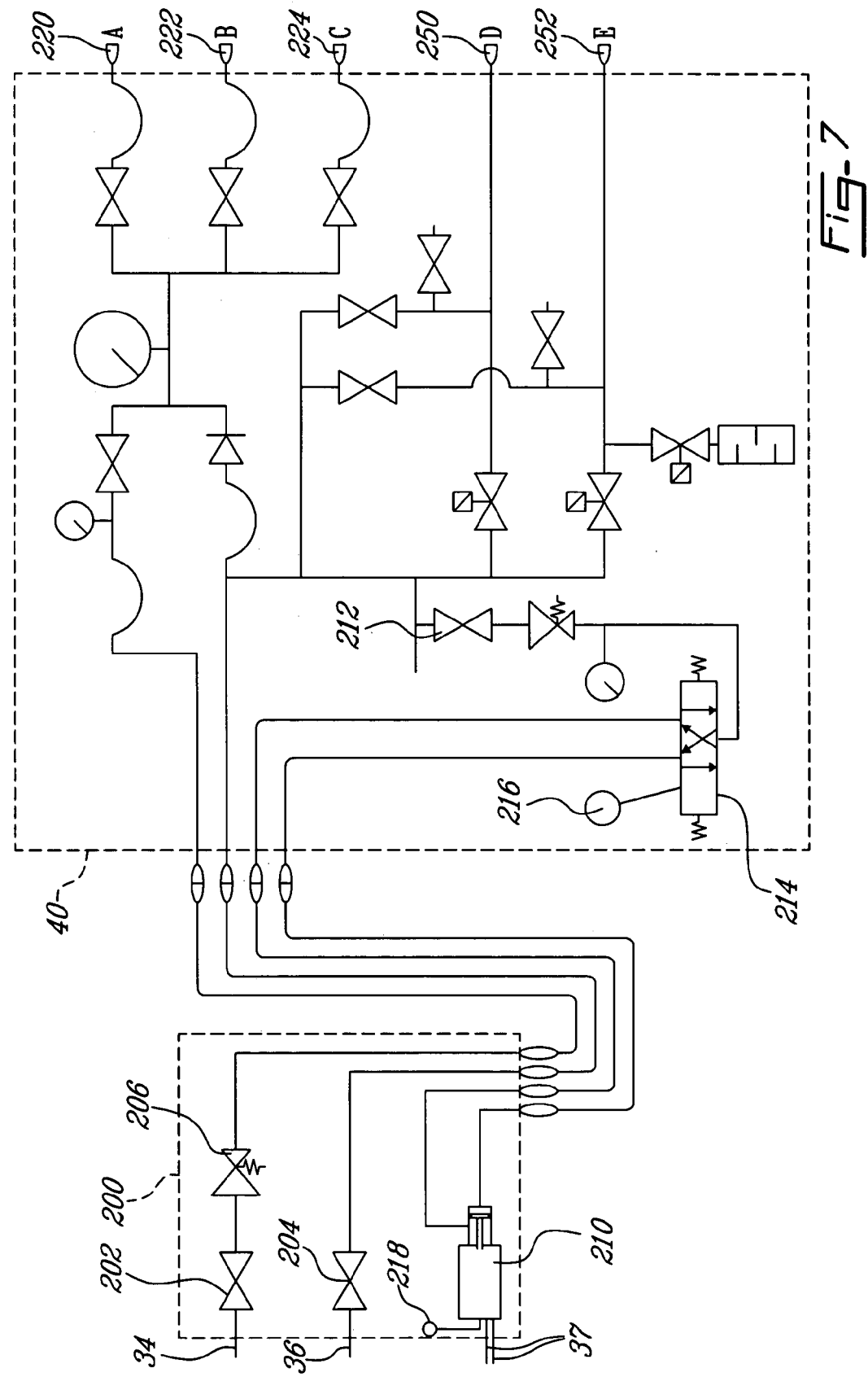
FIGS. 7 and 8 are diagrams showing the pneumatic system in accordance with the preferred embodiment.
Figure 8:
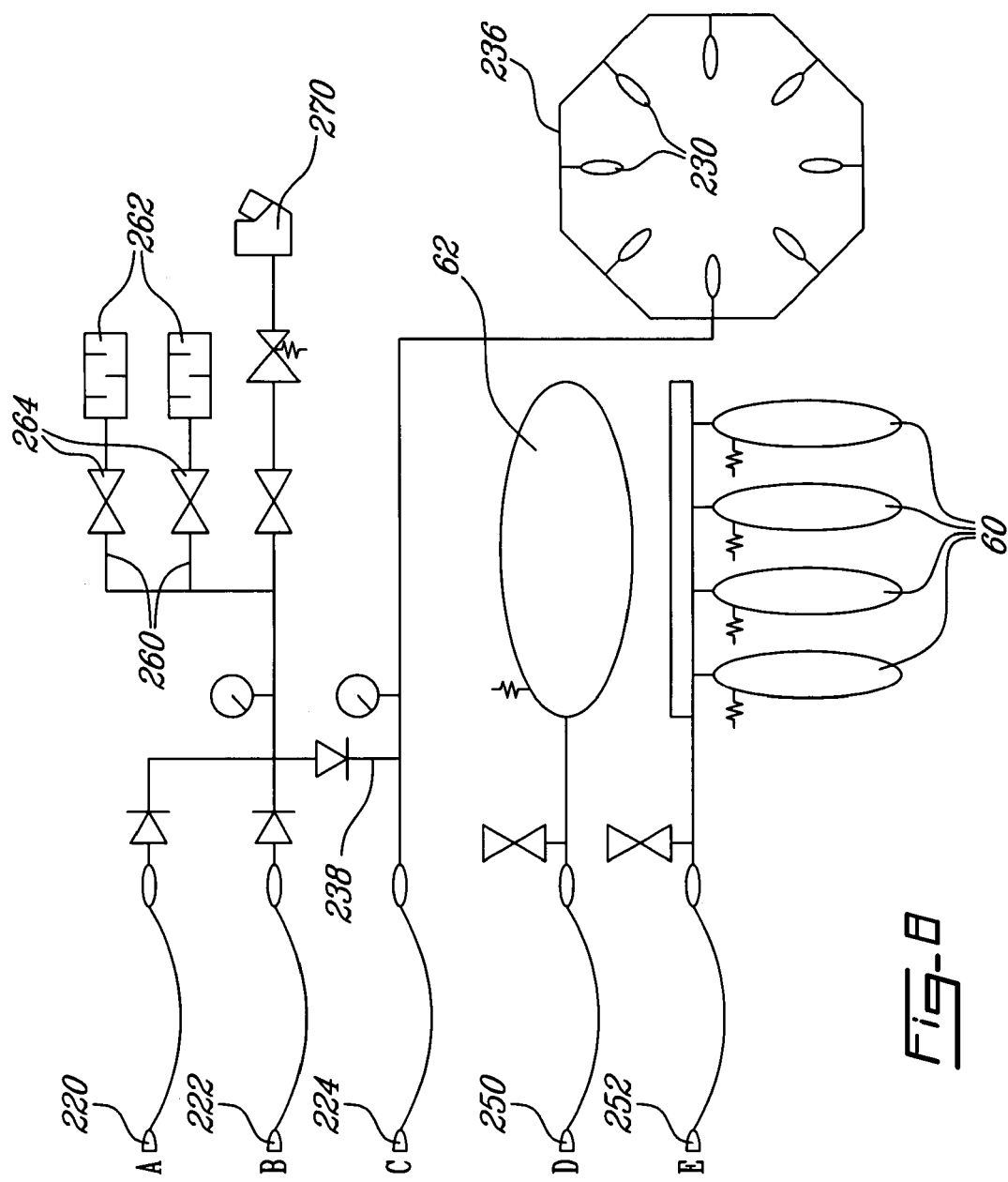

FIGS. 7 and 8 show the pneumatic system in accordance with the preferred embodiment. The low pressure system (34) and high pressure system (36) are usually located elsewhere in the building where the simulator (10) is located. Air is then supplied through supply lines, for instance using supply lines ending in a wall panel (200). Valves (202,204) allow the air supply to be controlled locally. A regulator (206) further brings the pressure of the high pressure system (36) to that of the low pressure system (34). Of course, air is of breathable quality or will otherwise need to be treated before being sent inside the submersible structure (20). In the preferred embodiment, the wall panel (200) also comprises a hydraulic valve (210) to control the hydraulic motor (58) of the winch (50). The hydraulic connections (37) are direct between the wall panel (200) and the umbilical cable (32). However, pressurized air goes through the control panel (40) and is directed to the appropriate circuits from there.

FIG. 7 shows that there are four pneumatic connections between the wall panel (200) and the control panel (40). The reason is that the hydraulic valve (210) is preferably controlled using a pneumatic arrangement. This pneumatic arrangement comprises an air inlet (212) connected to a pneumatic valve (214) controlled by a lever (216). The valve (214) is mounted in the control panel (40). The pressurized air from the pneumatic valve (214) controls the position of the hydraulic valve (210). This eliminates the need to have pressurized hydraulic lines in the control panel (40). For greater safety, the hydraulic valve (210) is provided with a manual control lever (218).

In the control panel (40), air from the two supply systems (34,36) is preferably merged and then split again in two supply lines (220,222) going into the umbilical cable (32). Other configurations are possible as well.

An emergency air supply circuit with regulators (230), referred to as "BIBS" and shown in FIG. 8, is provided in case of a failure of the other circuits. The BIBS (230) will allow people inside the submersible structure (20) to have air even if it becomes flooded entirely. For even greater safety, portable compact air systems (232) can be provided as well, as shown in FIG. 4. This will give the people a few minutes of air, which should be enough to leave the submersible structure (20) in case of an emergency. One should also be provided in the escape chamber (62). Air supplied to the BIBS (230) preferably has its own supply line (224) through the umbilical cable (32).

The main and emergency floats (70,72) are supplied with pressurized air using dedicated supply lines (250,252) in the umbilical cable (32). This allows the main float or floats (70) to be controlled entirely from the control panel (40). The floats (70,72) can also be depressurized from the control panel (40).

Air enters the main chamber (24) using appropriate distribution systems (260), each including a muffler (262) for reducing the noise. The air distribution systems (260) are controlled by the instructor using appropriate valves (264). The stole charging valve or valves (270) are also connected to the pneumatic system of the submersible structure (20). As aforesaid, stale air from the submersible structure (20) may be sent out through the flexible outer tube of the umbilical cable (32) itself. Accordingly, a valve (not shown) is advantageously provided in the main chamber (24) in order to close the air outlet in case the flexible outer tube be cut of punctured. The valve can also be closed if the main chamber (24) needs to be pressurized.

The BIBS (230) are supplied using their dedicated distribution circuit (236) in the submersible structure (20). However, a connection (238) with the regular air supply lines (220,222) is preferably provided in case the dedicated line (224) is not functioning.

FIG. 9 shows the hydraulic connections of the preferred embodiment. It shows that the hydraulic motor (58) further comprises a remotely disengagable brake (280). The brake (280) is normally part of the standard package of the hydraulic motor (58) since it allows the winch (50) to remain in the same position without any hydraulic pressure. This way, although the submersible structure (20) has a positive buoyancy, it will not move upwards when it is submerged. However, in this case, the brake (280) can be disengaged from outside using an additional hydraulic line (282) connected to an additional pump, for instance a manual hydraulic pump (284) located on the side of the pool (12). The additional hydraulic line (282) required to disengage the brake (280) is preferably present in the umbilical cable (32).

FIG. 10 illustrates an example of the control panel (40). The control panel (40) includes all the required valves, switches, gauges and light indicators that the supervisor must quickly access. It also comprises the communication system (42). In the preferred embodiment, one or more video cameras (290) are preferably installed in the main chamber (24) and the escape chamber (62), thereby allowing the supervisor to see what is going on using monitors (292) provided over the control panel (40). Tape recorders (294) or similar devices are used to record the training. This is very useful, among other things, for a later debriefing.

Figure 11:
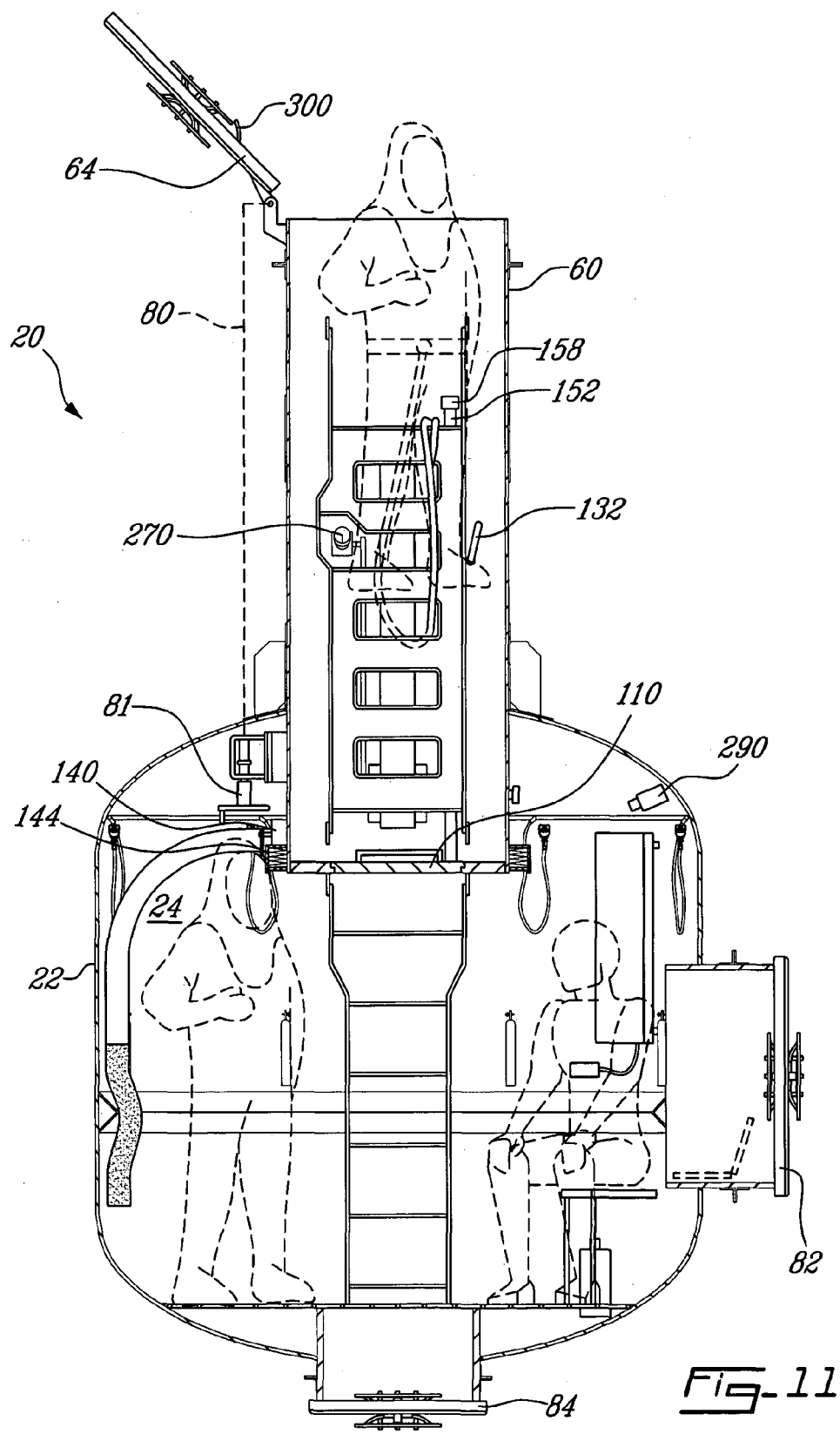
FIG. 11 illustrates the tower escape procedure using the submersible structure of FIG. 1.

They are two main escape procedures using an escape tower. The preferred way, which is also the less dangerous, is the tower escape. This method is illustrated in FIG. 11. It involves that the trainees escape one by one thought the escape tower (60). It should be noted that if required, a larger escape tower accommodating two trainees at once may be used. Such larger escape tower is provided on some submarines and allow speeding up the evacuation process.

Initially, trainees and at least one instructor preferably take position in the main chamber (24) using the upper hatch (64) while the submersible structure (20) is floating. As aforesaid, a bridge (not shown) is preferably provided to facilitate the access through the upper hatch (64). The trainees and the on-board instructor or instructors go down through the escape chamber (62) and take their position in the main chamber (24). If enough room is available, trainees may also be allowed to put their suit on once inside the main chamber (24). Otherwise, trainees must wear their escape suit before entering the submersible structure (20). The upper hatch (64) is closed and locked when everyone is on board and the submersible structure (20) is moved underwater to the required depth.

It should be noted that an adequate training session should always be done with medical personal standing next to the simulator (10). An hyperbaric chamber (not shown) should also be next to the simulator (10) or within a few minutes thereof.

During the training, each trainee, under the command of the instructor, will be asked to climb into the escape chamber (62) and close the lower hatch (110). The hood of their suit will then be over their face at that point. Prior to climbing into the escape chamber (62), they would make sure that the mechanism (80) controlling the upper hatch (64) is set to "idle". This refers to the position where the upper hatch (64) is free to open. Of course, the upper hatch (64) is unlocked at that point. Only the water pressure above the upper hatch (64) keeps it closed. Before entering the escape tower (60), each trainee must rehearse the valve operation sequence that is required for perfectly achieving the escape. A typical rehearsing is to check if the upper hatch mechanism (80) is at idle, if the venting valve (156) is open, if the drain valve (140) is shut, and if the cap (158) for closing the upper end (152) of the vent pipe (150) is in his hand. He then climbs into the escape chamber (62) and closes the lower hatch (110). Again, because each trainee trains for the "last man" situation, he may have to attach a rope or any other kind of strap to the lower hatch (110). Then, once inside the escape chamber (62), he must pull the lower hatch (110) into the escape chamber (62) before installing it in place. The suit is inflated using the stole charging valve (270) and the flooding of the escape chamber (62) is initiated using the flooding valve lever (132) in the escape chamber (62). It should be noted that the exact order of the steps can also be different. At the same time, the vent pipe (150) allows air to come out of the escape chamber (62) as the water level rises.

At one point, the trainee will have to manually close the upper end (152) of the vent air pipe (150) using the handheld cap (158). As aforesaid, the most difficult escape will be the one made by the last person to escape through the escape tower (60). That person will have to close the lower hatch (110) himself, open the flood valve (130) from inside the escape chamber (62), and close the air vent (152) at the appropriate time. If it is not closed, then the water level will not reach the required level for the upper hatch (64) to open. In a real submarine, this will only be possible once the compartment below the escape tower, and to which the air vent is connected, is completely flooded. For training purposes, it is possible to skip the manual closing, at least for the first time, and have the instructor or anyone else closing the venting valve (156) from the main chamber (24).

Once the escape chamber (62) is filled with water, the upper hatch (64) will open and the trainee can then proceed towards the surface of the pool (12), expelling air during his ascent. He will preferably be assisted by the diver. The diver will close the upper hatch (64) afterwards. A fairing plate (300), shown in FIGS. 4, 11 and 12, may be used on the interior locking wheel to prevent the trainees from being injured by it during the escape.

Meanwhile, if there other trainees in the main chamber (24), one of them will be asked to operate or simulate the operation of the remote closing mechanism of the upper hatch (64) and bring it to the closed position. The venting valve (156) and the drain valve (140) is opened in order to drain the water from the escape chamber (62). The lower hatch (110) is open when the escape chamber (62) is almost empty and another trainee will start or continue his training.

Figure 12:
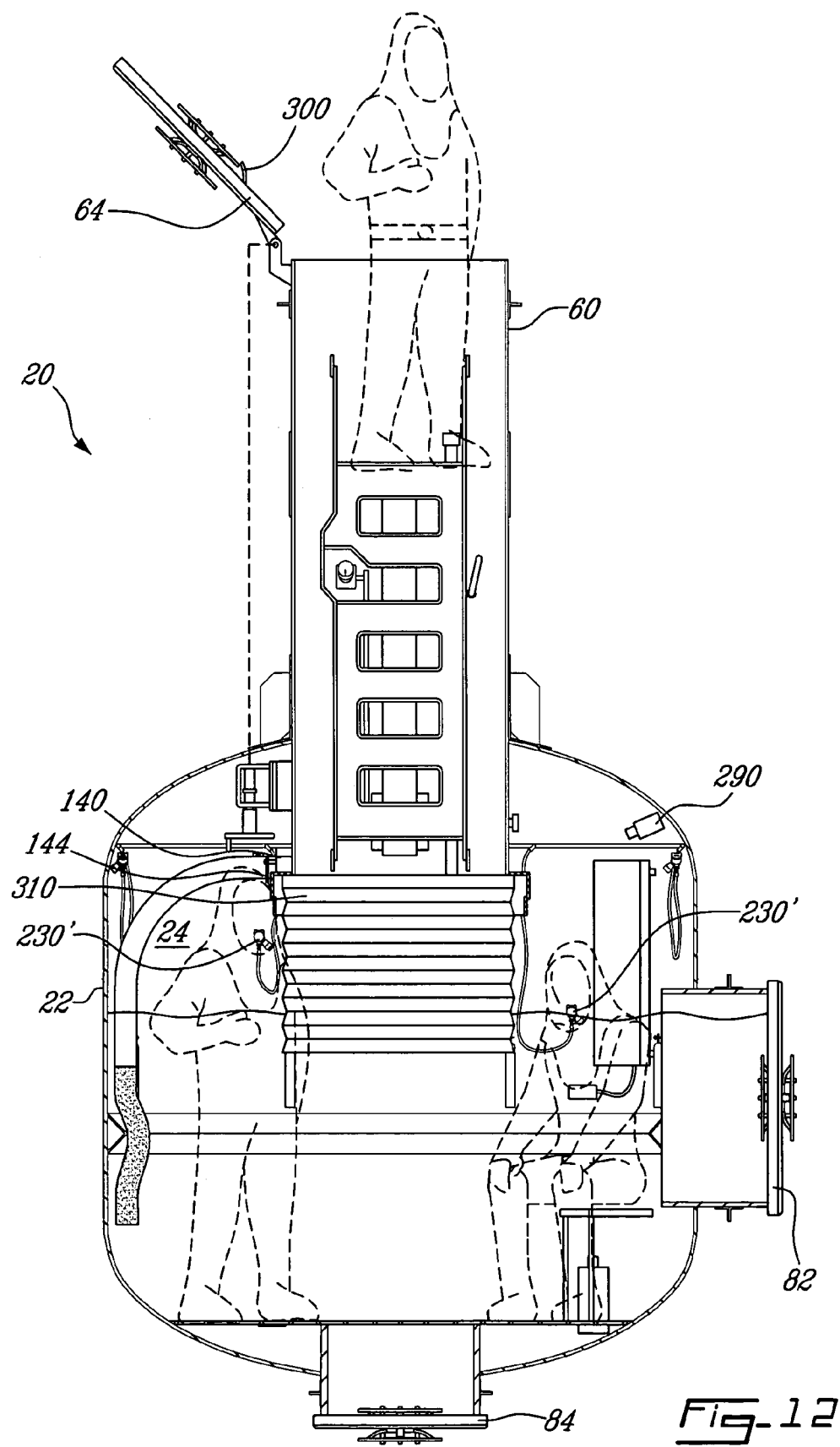
FIG. 12 illustrates the rush escape procedure using the submersible structure of FIG. 1.

Another escape procedure is the rush escape. This procedure is illustrated in FIG. 12. This is the last ditched method from a submarine and must only be used in the cases where there is no time to evacuate people one by one or two by two. In a rush escape, the lower hatch (110) of the escape tower (60) remains open. The bottom ladder (120), if any, is removed, as well as any obstacle near the lower hatch (110). The stale air outlet, if any, is closed. A skirt (310) will be pulled down from the periphery of the lower hatch (110). This skirt (310) is made of a highly resistant fabric. At that point, all trainees and the instructor would be wearing an escape suit. The main chamber (24) is flooded and pressurized. The flooding valve (130) of the escape chamber (60) will than be opened to flood the compartment. Any other available means are used to poor water into the main chamber (24) as fast as possible. At the same time, the pressure inside the main chamber (24) is increased. The flooding and pressurization of the main chamber (24) continues until the pressure therein equals that of the surrounding water outside the submersible structure (20). At that point, the upper hatch (64) can be wide open. A column of water fills entirely the escape chamber (62) and the volume inside the skirt. The idea is that trainees, like in a real submarine in such situation, will need to dive under the skirt (310) and directly escape through the escape chamber (62) in a very quick manner. The skirt (310) prevents the water level inside the main chamber (24) from being too high.

Rush escapes are considerably more dangerous, mainly because of the pressure to which the trainees will be exposed. Training for the rush escape can be practiced at a very shallow level, thereby minimizing the danger. As aforesaid, the pressure inside a real submarine is usually maintained at the sea level. However, in the case of a rush escape, the pressure will be much higher and the trainees will be subjected to a very rapid increase. Obviously, anyone escaping using the rush escape cannot follow the decompression sequences when ditching out of a real submarine and they will likely need to be treated as soon as possible in a hyperbaric chamber. This condition worsens with the time spent at the increased pressure in the submarine. The air quality is also likely to deteriorate more quickly with the increased pressure if there is a contamination. Submariners must then use special BIBS (230') while they are waiting to escape. They would then use a technique called "fleeting" to move towards the escape tower of the submarine. Fleeting is a procedure where a submariner moves from one BIBS (230') to another, each time checking whether the next BIBS (230') is functioning or not. The reason is that they may not be able to get back because another person will then be breathing through the preceding one. The special BIBS (230') are different compared to the usual BIBS (230) in that they are each provided with a stole changing valve.

During the training for the rush escape procedure, the trainees must put on their hood, inflate their suit through the stole charging valve of the BIBS (230') and manage to reach the water column by diving under the skirt (310). This is not easy because the suit is fully inflated at that time.

As can be appreciated, the simulator (10) and the method in accordance with the present invention allow that the underwater submarine escape training to be conducted in a safe and controlled environment.

What is claimed is:

1. A simulator for performing underwater submarine escape training in a body of water, the simulator comprising:
   a submersible structure comprising:
      a bell defining a main chamber; and
      an escape tower provided over the bell and defining an escape chamber communicating with the main chamber, the escape tower having a lower hatch between the main chamber and the escape chamber, and an upper hatch separating the escape chamber from outside the submersible structure; and
   means for vertically moving the submersible structure relative to the water surface of the body of waters,
   wherein the submersible structure further comprises:
      means for flooding the escape chamber;
      means for draining the escape chamber; and
      means for venting the escape chamber during flooding and draining.

2. The simulator according to claim 1, wherein the submersible structure comprises a base connected under the bell.

3. The simulator according to claim 2, wherein the base comprises ballasts.

4. The simulator according to claim 2, wherein the base is connected under the bell by a plurality of removable fasteners.

5. The simulator according to claim 1, wherein the means for flooding the escape chamber comprise a flooding valve, the flooding valve being configured and disposed to control a flow of water into the escape chamber coming from the body of water, the flooding valve being operated using either a first flooding valve lever in the escape chamber and a second flooding valve lever in the main chamber.

6. The simulator according to claim 1, wherein the means for draining the escape chamber comprise a draining valve, the draining valve being configured and disposed to control a flow of water between the bottom of the escape chamber and a sump, the draining valve being operated using a draining valve lever in the main chamber.

7. The simulator according to claim 6, wherein the main chamber further comprises floor gratings and a sump pump, the sump pump having an inlet underneath the floor gratings to which is directed water drained from the escape chamber, and an outlet to send the water outside the submersible structure.

8. The simulator according to claim 1, wherein the means for venting the escape chamber during flooding and draining comprises an air pipe having a upper end located near the upper hatch, and a bottom end connected to a venting valve, the venting valve being configured and disposed to control a flow of air from and to the escape chamber.

9. The simulator according to claim 1, further comprising at least one inflatable float connected outside the submersible structure, the inflatable float being provided to control buoyancy of the submersible structure.

10. The simulator according to claim 1, wherein the bell comprises a side maintenance hatch between the main chamber and outside the submersible structure.

11. The simulator according to claim 1, wherein the bell comprises a bottom emergency exit hatch between the main chamber and outside the submersible structure.

12. The simulator according to claim 1, further comprising a remote supply unit, the remote supply unit being connected to the submersible structure by an umbilical cable.

13. The simulator according to claim 12, wherein the umbilical cable at least comprises a breathing air link and an electrical power link.

14. The simulator according to claim 13, wherein the umbilical cable further comprises a telecommunications link.

15. The simulator according to claim 12, wherein the remote supply unit is controlled from control panel located outside the body of water.

16. The simulator according to claim 12, wherein the submersible structure has a positive buoyancy, the means for vertically moving the submersible structure comprising means for pulling the submersible structure downwards.

17. The simulator according to claim 16, wherein the means for pulling the submersible structure downwards comprise a winch connected to the submersible structure, the winch being operated in conjunction with a cable connected to a bottom location in the body of water.

18. The simulator according to claim 17, wherein the winch comprises a hydraulic motor, the hydraulic motor being powered through hydraulic pressure lines included in the umbilical cable.

19. The simulator according to claim 17, wherein the bottom location comprises at least one pulley anchored to a fixed location.

20. The simulator according to claim 19, wherein the fixed location is a dead weight.

21. A simulator for performing underwater submarine escape training in a body of water, the simulator comprising:
a submersible structure comprising:
a bell defining a main chamber; and
an escape tower provided over the bell and defining an escape chamber communicating with the main chamber, the escape tower having a lower hatch between the main chamber and the escape chamber, and an upper hatch separating the escape chamber from outside the submersible structure;
means for vertically moving the submersible structure relative to the water surface of the body of water,
a remote supply unit, the remote supply unit being connected to the submersible structure by an umbilical cable,
wherein the submersible structure has a positive buoyancy, and
the means for vertically moving the submersible structure comprising means for pulling the submersible structure downwards,
wherein the means for pulling the submersible structure downwards comprise a winch connected to the submersible structure,
the winch being operated in conjunction with a cable connected to a bottom location in the body of water, and
the winch comprises a hydraulic motor, the hydraulic motor being powered through hydraulic pressure lines included in the umbilical cable, and
wherein the hydraulic motor comprises a remotely-disengagable brake, the umbilical cable including an additional hydraulic pressure line to disengage the brake from outside the body of water.

22. The simulator according to claim 1, further comprising a traveling crane located above the body of water.

23. The simulator according to claim 1, wherein the body of water is a pool.

24. A simulator for performing underwater submarine escape training in a body of water, the simulator comprising:
a submersible structure comprising:
a bell defining a main chamber; and
an escape tower provided over the bell and defining an escape chamber communicating with the main chamber, the escape tower having a lower hatch between the main chamber and the escape chamber, and an upper hatch separating the escape chamber from outside the submersible structure; and
means for vertically moving the submersible structure relative to the water surface of the body of water, wherein the body of water is a pool, and
wherein the pool comprises a vertical shaft downwardly extending from a bottom portion of a shallower section of the pool.

25. The simulator according to claim 1, wherein the bell comprises emergency breathing system to which are connected a plurality of individual BIBS located in the main chamber.

26. A simulator for performing underwater submarine escape training in a body of water, the simulator comprising:
a submersible structure comprising:
a bell defining a main chamber; and
an escape tower provided over the bell and defining an escape chamber communicating with the main chamber, the escape tower having a lower hatch between the main chamber and the escape chamber, and an upper hatch separating the escape chamber from outside the submersible structure; and
means for vertically moving the submersible structure relative to the water surface of the body of water, and
an extendable rush escape skirt to be pulled downwards in the chamber from a periphery of the lower hatch of the escape tower.

27. A method of performing underwater submarine escape training in a body of water, the method comprising:
A) providing a submersible structure comprising:
a bell defining a main chamber; and
an escape tower provided over the bell and defining an escape chamber communicating with the main chamber, the escape tower having a lower hatch between the main chamber and the escape chamber, and an upper hatch separating the escape chamber from outside the submersible structure;
B) allowing at least one trainee and at least one instructor to be positioned inside the main chamber;
C) completely submerging the submersible structure at a given depth in the body of water; and
D) allowing the trainee to enter the escape tower and leave the submersible structure through the upper hatch, wherein the trainee performs a tower escape comprising:
wearing an inflatable escape suit;
rehearsing a valve operation sequence;
climbing into the escape tower;

closing the lower hatch;
inflating the inflatable escape suit;
flooding the escape tower; and
exiting through the upper hatch into the body of water.

28. The method according to claim 27, further comprising:
manually closing an upper end of a venting pipe located near the upper hatch in the escape chamber immediately before water reaches the end the venting pipe when the escape chamber is flooded.

29. The method according to claim 27, further comprising:
providing a diver around the submersible structure in the body of water to assist the trainee.

30. A method of performing underwater submarine escape training in a body of water, the method comprising:
A) providing a submersible structure comprising:
a bell defining a main chamber; and
an escape tower provided over the bell and defining an escape chamber communicating with the main chamber, the escape tower having a lower hatch between the main chamber and the escape chamber, and an upper hatch separating the escape chamber from outside the submersible structure;
B) allowing at least one trainee and at least one instructor to be positioned inside the main chamber;
C) completely submerging the submersible structure at a given depth in the body of water; and
D) allowing the trainee to enter the escape tower and leave the submersible structure through the upper hatch;
E) monitoring the training using an operator at a control center located outside the body of water; and
F) allowing the supervisor to abort the training upon noticing a critical problem.

31. The method according to claim 30, wherein the monitoring comprises:
providing the operator with video and audio information using a video and audio link between the submersible structure and the control center.

32. The method according to claim 31, further comprising:
recording the video and audio information at the control center.

33. The method according to claim 30, further comprising:
monitoring air quality in the main chamber.

34. The method according to claim 27, wherein in step C), the submersible structure has a positive buoyancy, the submersible structure being submerged by pulling it downwards.

35. The method according to claim 34, further comprising:
adjusting the buoyancy of the submersible structure by selectively inflating and deflating at least one inflatable float connected outside the submersible structure.

36. A method of performing underwater submarine escape training in a body of water, the method comprising:
A) providing a submersible structure comprising:
a bell defining a main chamber; and
an escape tower provided over the bell and defining an escape chamber communicating with the main chamber, the escape tower having a lower hatch between the main chamber and the escape chamber, and an upper hatch separating the escape chamber from outside the submersible structure;
B) allowing at least one trainee and at least one instructor to be positioned inside the main chamber;
C) completely submerging the submersible structure at a given depth in the body of water, wherein the submersible structure has a positive buoyancy, the submersible structure being submerged by pulling it downwards; and
D) allowing the trainee to enter the escape tower and leave the submersible structure through the upper hatch;
wherein the submersible structure comprises a hydraulic brake operated to retain it in a submerged position, and the method further comprises: releasing the hydraulic brake from outside the body of water using an emergency hydraulic system.

37. The method according to claim 27, further comprising:
inflating an emergency air float to bring the submersible structure at the surface of the body of water.

* * * * *

UNITED STATES PATENT AND TRADEMARK OFFICE
CERTIFICATE OF CORRECTION

PATENT NO.        : 7,174,844 B2
APPLICATION NO. : 10/616229
DATED             : February 13, 2007
INVENTOR(S)       : Louis Hébert et al.

It is certified that error appears in the above-identified patent and that said Letters Patent is hereby corrected as shown below:

On the Title Page, Item (73), Assignee; please delete "Maritim" and insert -- Maritime --.

Signed and Sealed this

Fifth Day of June, 2007

JON W. DUDAS
*Director of the United States Patent and Trademark Office*